United States Patent [19]

Humphries

[11] 4,129,856

[45] Dec. 12, 1978

[54] FILTER SYSTEM AND METHOD FOR INTRUSION ALARM

[75] Inventor: Peter E. Humphries, King, Canada

[73] Assignee: Contronic Controls Limited, Mississauga, Canada

[21] Appl. No.: 742,048

[22] Filed: Nov. 15, 1976

[51] Int. Cl.² ......................... G01S 9/02; G08B 13/16
[52] U.S. Cl. ............................... 340/554; 307/233 R; 343/5 PD
[58] Field of Search ........... 340/258 R, 258 A, 258 B; 343/5 PD, 5 DP; 307/233 R, 234; 328/111, 138, 140, 141

[56] References Cited

U.S. PATENT DOCUMENTS

| | | | |
|---|---|---|---|
| 3,582,870 | 6/1971 | Peterson et al. | 340/1 |
| 3,638,210 | 1/1972 | Hankins et al. | 340/258 A |
| 3,754,222 | 8/1973 | Eisenberg | 340/258 A |
| 3,801,977 | 4/1974 | Cotter | 340/258 A |
| 3,813,669 | 5/1974 | Saunders | 343/5 PD |
| 3,925,687 | 12/1975 | Solomon | 307/233 R |

Primary Examiner—John W. Caldwell, Sr.
Assistant Examiner—Joseph E. Nowicki
Attorney, Agent, or Firm—Rogers, Bereskin & Parr

[57] ABSTRACT

An intrusion alarm of the kind in which a radiation field is transmitted in an area to be supervised; the reflected field is received and compared with the transmitted field, and a comparison signal is produced the frequency of which is indicative of the speed of movement of an object in the supervised area. A signal processor receives the comparison signal and generates an alarm if the comparison signal contains components in a selected frequency range. The processor includes a unique filter block which removes unwanted frequency components outside the range. The filter block includes a pulse generator which generates a constant amplitude pulse train, each pulse corresponding to a pulsation of the comparison signal, and control elements which control the duty cycle of the pulse train so that as the frequency of the comparison signal increases, the average level of the pulse train first increases and then decreases. The pulse train is integrated and operates an alarm signal generator when its average level rises above a preselected level.

9 Claims, 13 Drawing Figures

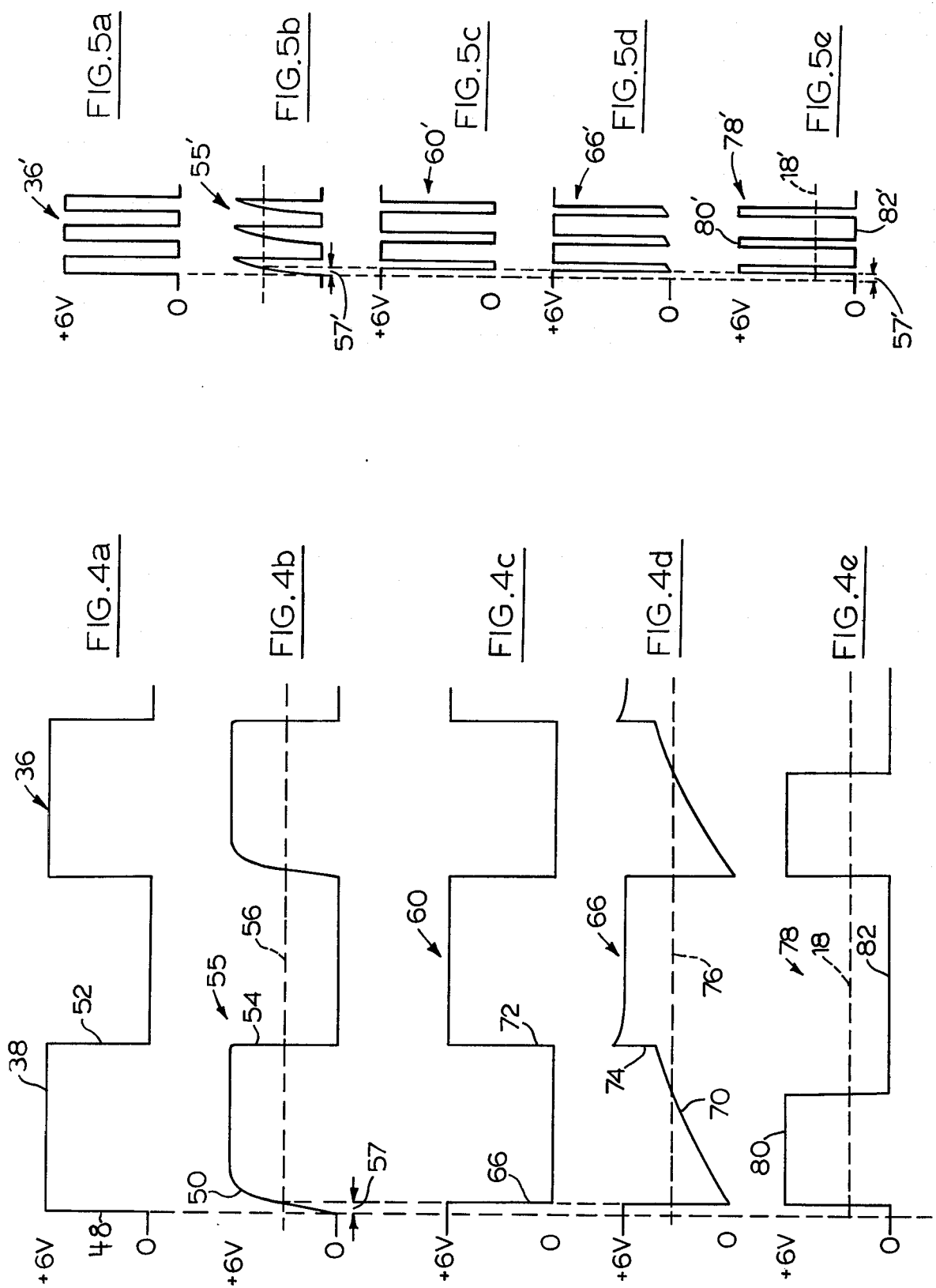

FILTER SYSTEM AND METHOD FOR INTRUSION ALARM

This invention relates to apparatus and a method for detecting the presence of an intruder and for producing an alarm signal when such detection occurs.

Intrusion alarms commonly operate by transmitting an ultrasonic or electromagnetic field, receiving a portion of the reflected field, and comparing the two. If a moving intruder is present, a doppler shift is created in the received field. The doppler shift is detected and is used to produce an alarm indication.

One of the major difficulties with prior intrusion alarms has been the frequency of false alarms. Disturbances such as rustling curtains, telephone or other bells, the scraping of snow ploughs, noisy motor bearings, or hot air from heating systems, all produce disturbances which are likely to create a false alarm, particularly when the transmitted field is ultrasonic sound. Active filters have been used in an attempt to discriminate between such disturbances and the disturbance caused by an intruder, but they have been generally unsatisfactory. This is because the received field is usually weak because of attenuation along its path of travel, so it must be highly amplified before the disturbance signals can be processed. If the amplitude of an unwanted disturbance signal is sufficiently large, as it often is, the high amplification causes part of the unwanted disturbance signal to leak through the filter, triggering a false alarm.

The problem is made more acute when the transmitted field is ultrasonic sound transmitted at higher frequencies. Higher frequencies (typically above 30 KHz) are desirable since the coverage of such fields is less affected by changes in the temperature, density and humidity of the air through which they travel. However, since the attenuation of higher frequency sound waves is greater than that of lower frequency sound, even more amplification is needed at higher frequencies and the likelihood of false alarms increases correspondingly.

Accordingly, it is an object of the invention to provide an intrusion alarm in which the likelihood of false alarms is reduced. In a preferred embodiment of the invention this is achieved by providing an intrusion alarm comprising:

(1) means for transmitting a radiation field in an area to be supervised,
(2) means for receiving a portion of the radiation field which is reflected from objects in the supervised area,
(3) means for comparing the transmitted and received fields and for producing a comparison signal having pulsations the frequency of which is indicative of the speed of movement of an object in said supervised area,
(4) means connected to said comparison means for generating an output pulse train of constant peak amplitude, and including means for controlling the duty cycle of said output pulse train for the average level of said output pulse train to increase as the frequency of said comparison signal increases, until the frequency of said comparison signal reaches a selected frequency, and then to decrease as the frequency of said comparison signal increases beyond said selected frequency,
(5) integrating means connected to said means (4) for integrating said output pulse train to produce an integrated d.c. signal therefrom,
(6) and means connected to said integrating means and responsive to the average level of said integrated DC signal for producing an alarm signal when such average level rises above a pre-selected level.

Further aspects and advantages of the invention will appear from the following disclosure, taken together with the accompanying drawings, in which:

FIG. 1 is a block diagram of a system according to the invention;
FIG. 2 is a frequency response curve for a portion of the system of FIG. 1;
FIG. 3 is a schematic diagram of the system of FIG. 1;
FIGS. 4a to 4e show low frequency wave forms for the FIGS. 1 and 2 systems; and
FIGS. 5a to 5e show high frequency wave forms for the FIGS. 1 and 2 system.

GENERAL DESCRIPTION

The invention will be described with reference to an intrusion detector which employs ultrasonic sound. Reference is first made to the block diagram of FIG. 1, which shows a typical embodiment of the invention. The FIG. 1 system includes an oscillator 2 which provides the required ultrasonic frequency electrical signal and which can be located with the remainder of the FIG. 1 system or remotely in a separate master unit. The signal from the oscillator 2 may be of any appropriate frequency, typically 40 KHz.

The 40 KHz signal from oscillator 2 is used to drive a transmitter 4, which radiates a 40 KHz sound field into the area to be supervised. The ultrasonic sound waves which are reflected from objects and walls in the supervised area are received by a transducer and receiver 6, the output of which is amplified by amplifier 8.

The resultant amplified signal from amplifier 8 is compared with the transmitted signal by a synchronous detector consisting of transistor Q1. The base of transistor Q1 is connected to the oscillator 2 so that transistor Q1 is switched on and off by the same signal which drives the transmitter.

The signal at the collector of transistor Q1 is directed through a band pass filter 10. The filter 10 attenuates frequencies below about 40 Hz and also attenuates high frequencies, thus substantially removing the 40 KHz component. Ideally the frequency of the output signal from filter 10 now contains only a narrow band of frequencies, namely those frequencies which are likely to be generated by the movement of an intruder and not by other factors. However, in practice the output signal from filter 10 usually also contains other frequency components caused by unwanted disturbing factors.

It is found that the doppler frequency caused by moving intruders usually falls in the range 40 to 300 Hz when a 40 KHz sound field is transmitted. It is found that under a wide range of conditions, frequencies within the range 40 to 300 Hz in many unoccupied premises being supervised are unlikely to be generated in the comparison signal by anything but a moving intruder. Disturbances at such premises, other than intruders, generally produce components in the comparison signal which are outside that frequency range.

Therefore, the signal from band pass filter 10 is amplified by amplifier 12 and is then directed into a non-linear filter block 14. The non-linear filter block 14, which is a key part of the invention and will be described in detail, produces a d.c. output signal, the level of which depends on the frequency of the output signal from the band pass filter 10. The frequency response of the non-linear filter block 14 for a prototype of the present invention is shown in FIG. 2, in which input frequency is plotted along the horizontal axis (note that the scale shifts at 100 Hz to keep the graph within manageable limits), and d.c. output voltage is plotted along the vertical axis. The filter block 14 response 15 is designed to rise sharply with input frequency to a peak at about 40 Hz, and then to fall off approximately linearly as the input frequency increases beyond 40 Hz. Since the filter block 14 is frequency dependant and is not affected by the amplitude of the received signal (provided that the received signal is of adequate amplitude), high frequency components in the input signal, even if they are of high amplitude, do not produce an increase in output.

The d.c. output from the filter block 14 is directed to a biased voltage discriminator 16. The discriminator 16 is set so that it produces an output only so long as its input voltage received from the filter block 14 exceeds a predetermined level (typically level 18 in FIG. 2). Level 18 is selected to be the level reached by the output of the filter block 14 when the filter block 14 receives an input signal of frequency between about 40 and 300 Hz. Therefore, the discriminator 16 will produce an output whenever an intruder, for example, moves rapidly enough to produce a doppler shift of between 40 and 300 KHz in the 40 KHz signal received by transducer-receiver 6. The output from voltage discriminator 16 usually takes the form of one or more relatively short pulses, the duration of which depend on the duration of movement of the intruder. The pulses from discriminator 16 are therefore directed to a pulse stretcher 20, which produces pulses of a predetermined minimum length whenever it receives a pulse from discriminator 16. The pulses from pulse stretcher 20 are applied to an alarm signal generator 22 which produces an appropriate alarm.

DETAILED DESCRIPTION

Figure 1:
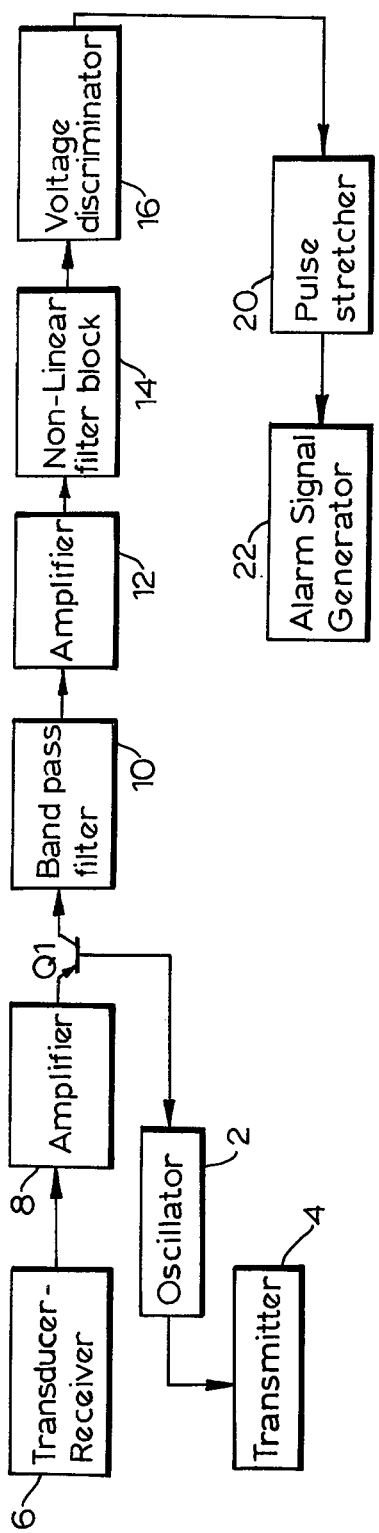
Figure 2:
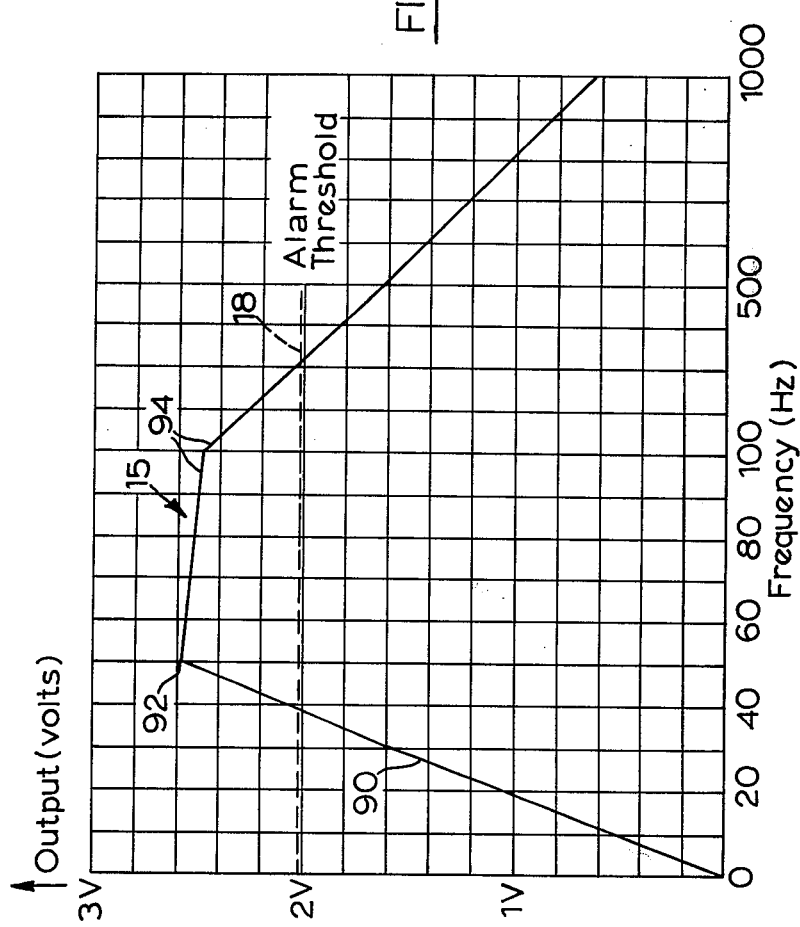
Figure 3:
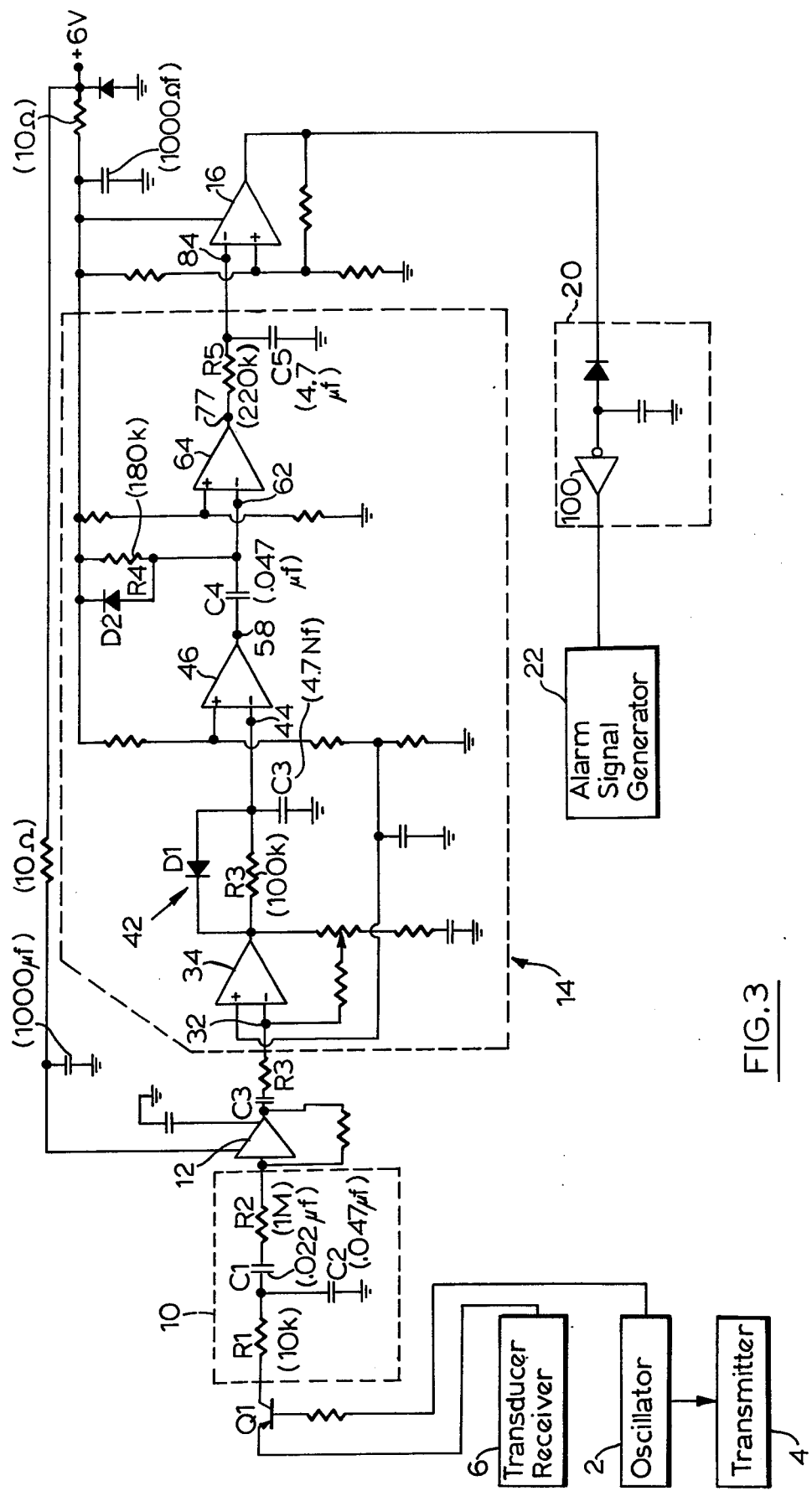

Reference is next made to FIG. 3, which shows the circuit of FIG. 1, including the non-linear filter block 14, in more detail. In FIG. 2, the values of typical components used are shown in parenthesis beside the components.

As shown in FIG. 2, the signal from the collector of transistor Q1 is directed through resistor R1, capacitor C1 and resistor R2 to the input 30 of amplifier 12, which is a high gain high impedance operational amplifier. Capacitor C1 acts to attenuate very low frequencies, while a capacitor C2 connected between resistor R1 and ground removes high frequencies, including the 40 KHz driving signal. Components R1, R2, C1, C2 together constitute the bandpass filter 10.

The output from amplifier 12 is directed through capacitor C3 and resistor R3 to input terminal 32 of a high gain amplifier 34. Amplifier 34, which forms part of non-linear filter block 14, is biased so that it saturates when it receives an input signal above a minimum amplitude. The output signal from amplifier 34 is therefore normally a square wave train, as shown at 36 in FIG. 4a. Square wave train 36 swings between ground and +6 volts (the d.c. supply level), and each positive pulse 38 of wave train 36 corresponds to the negative going half cycle of the input signal to amplifier 34.

The output terminal 40 of amplifier 34 is connected to a non-linear low pass filter 42 comprising diode D1, resistor R3 and capacitor C3. The output of the low pass filter 42 is connected to the input terminal 44 of a high gain amplifier 46. The operation of filter 42 is as follows. When wave train 38, FIG. 4a, goes positive as indicated at 48, diode D1 is reverse biased, and capacitor C3 charges through resistor R4. Because of the time constant of the charging circuit through resistor R4, the voltage at input terminal 44 of amplifier 46 rises relatively slowly. The slow rise is indicated at 50 in FIG. 4b, which shows the voltage level at input terminal 44 of amplifier 46. However, when the signal at the output of amplifier 34 drops to zero, as indicated at 52 in FIG. 4a, diode D1 of filter 42 becomes forward biased, permitting capacitor C3 to discharge rapidly through diode D1, and the voltage level at input terminal 44 of amplifier 46 falls rapidly. The rapid fall is indicated at 54 in FIG. 4b. The result is that the pulses of the wave train 55 at input terminal 44 of amplifier 46 have a relatively slow rise time and a rapid fall time, as shown in FIG. 4b.

Amplifier 46 is biased so that it turns on only when the voltage at its input terminal 44 exceeds a preset bias level indicated at 56 in FIG. 4b. The time interval 57 for the waveform 55 to rise to this level is typically about 1 millisecond in the example illustrated. Since amplifier 46 is an inverting amplifier, its output at terminal 58 is shown as waveform 60 in FIG. 4c. As shown, each pulse of waveform 60 begins later than its corresponding pulse in waveform 36 by the duration of the fixed time interval 57.

The output terminal 58 of amplifier 46 is connected through a capacitor C4 to input terminal 62 of an amplifier 64 which is biased to conduct on negative input peaks only (as will be explained). Input terminal 62 is also connected via a parallel combination of diode D2 and resistor R4 to the positive voltage supply.

The waveform at the input terminal 62 of amplifier 64 is shown at 66 in FIG. 4d. This wave form is produced as follows. When waveform 60 of FIG. 4c drops from plus 6 volts to zero, as indicated at 68, the resultant negative going step is transmitted through capacitor C4 to input terminal 62, reverse biasing diode D2. Capacitor C4 then charges slowly through resistor R4, causing a slow increase 70 (FIG. 4d) in the voltage at input terminal 62. When waveform 60 (FIG. 4c) goes positive again, as indicated at 72, a positive going step is transmitted through capacitor C4 to terminal 62, driving the voltage at this terminal positive as indicated at 74 in FIG. 4d. This forward biases diode D2, discharging capacitor C4 rapidly so that the voltage at terminal 62 rapidly falls to 6 volts, where it remains for the remainder of the half cycle.

Amplifier 64 is biased, as indicated by bias level voltage 76 in FIG. 4d, so that it turns on only while the voltage at its input terminal 62 is below the level 76. The resultant output wave form at terminal 77 of amplifier 64 is shown at 78 in FIG. 4e. Waveform 78 consists of "on" intervals, or positive going square wave pulses 80, of approximately 9 milliseconds duration (the duration is controlled by the discharge time of capacitor C4 through resistor R4), separated by "off" intervals 82.

The waveform 78 at terminal 77 is directed through integrating elements, namely resistor R5 and capacitor C5, to the input terminal 84 of voltage discrimator 16. Resistor R5 and capacitor C5 integrate waveform 78, providing a relatively steady d.c. signal the level of which is equal to the average level of waveform 78.

When the level of this d.c. signal exceeds the bias level 18 (FIGS. 3 and 4e) of voltage discriminator 16, the discriminator 16 produces an output.

It will be seen from inspection of the waveforms of FIG. 4 that the "on" portions 80 of waveform 78 can never exceed the period timed by capacitor C4 and resistor R4 (here about 9 milliseconds), and the "off" portions 82 of waveform 78 will occupy the remaining part of each cycle of the input waveform 36. When the frequency of waveform 36 is low, the "duty cycle" or average level of output waveform 78 will therefore be very low. As the input frequency increases, the "duty cycle" of waveform 78, i.e. the ratio of the duration of the "on" pulses 80 to that of the "off" pulses 82, increases linearly, and therefore the average level of waveform 78 increases linearly with input frequency. This is shown as portion 90 of response curve 15, FIG. 2.

As the input frequency increases, the average level or duty cycle of waveform 78 reaches a maximum when the duration of the maximum "on" portion 80 of waveform 78, plus the fixed interval 57, is equal to the duration of each "off" portion 82. The frequency at which this occurs is marked at 92 in FIG. 2. Since the duration of the maximum "on" portion 80 is 9 m.s. in the example illustrated, and interval 57 is 1 m.s., frequency 92 occurs when each "off" portion 82 is 9 + 1 = 10 m.s. in duration. This corresponds to an input frequency cycle duration of 20 m.s., or 50 Hz.

As the frequency of input waveform 36 increases beyond 50 Hz, waveform 66 (FIG. 4d) begins to go positive in each half cycle before capacitor C4 charges to the bias level 76 (FIG. 4d). Therefore, the duration of each "on" portion 80 of waveform 78 (FIG. 4e) is reduced. The duration of each "on" portion 80 now becomes equal to the duration of each half cycle of input waveform 36 less the fixed interval 57. As the frequency of waveform 36 continues to increase, the fixed interval 57 becomes a larger proportion of each "on" portion 80, and the duty cycle or average level of output waveform 78 falls. This is shown as portion 94 of frequency response curve 15, FIG. 2. (Portion 94 is in fact linear but the horizontal scale of FIG. 2 changes at 100 Hz to keep the length of the graph manageable.)

In general, it will be seen that the duration of each "on" portion 80 of waveform 78 is equal to either (a) 9 m.s. (determined by capacitor C4 charging through resistor R4), or (b) the duration of each half cycle of input waveform 36 less the fixed interval 57, whichever is less.

By way of example, FIGS. 5a to 5e show waveforms corresponding to those of FIGS. 4a to 4e (primed reference numerals are used to indicate corresponding parts) but at a much higher input frequency. As shown in FIG. 5b, the duration of each fixed interval 57 is a substantial proportion of each half cycle 38 of the input waveform 36. The duty cycle, and therefore the average level, of waveform 78, has consequently become relatively low.

As indicated previously, the threshold at which discriminator 16 operates to produce an output is shown at 18 in FIG. 2. In the example given, this corresponds to a range of frequencies of between about 38 and 320 Hz for the input signal. Input signals having a high frequency, no matter what their amplitude, will not produce an output since the output is dependent entirely upon the frequency of the input signal and not upon its amplitude (provided that at least a minimum amplitude input signal is received). As a result, the immunity of the system to spurious signals is much improved. It is found that the system's immunity is for example much improved for sounds produced by telephone and other bells, which produce false alarms in most competitive systems.

When discriminator 16 produces an output, even of short duration, this operates Schmidt trigger 100 in pulse stretch 20. Trigger 100 then produces a timed output pulse which constitutes an alarm signal and may be used as desired. As shown in FIG. 1, the pulse may be used to operate an alarm signal generator 22.

An additional advantage of the system described is that it enables ultrasonic operation at higher frequencies. Most ultrasonic alarm systems operate at a broadcast sound field frequency of between 20 KHz and 26.5 KHz. Higher frequencies are generally avoided because they are attenuated to a greater extent in air. The higher attenuation requires greater amplification, resulting in a greater likelihood of false alarms. However, apart from the false alarm difficulty, higher frequencies (30 KHz and up) are desirable because they are less affected by changes in atmospheric conditions such as air pressure, humidity and termperature. For example, if an intrusion alarm is adjusted under conditions of low humidity and high air pressure to cover a specified area, then under conditions of high temperature and humidity with resultant low air pressure, the pattern of protection may be only 70% of the original setting. Conversely, if a system is adjusted on a summer day to avoid sources of interference in the room, such as air conditioners, then on a winter day, the pattern of protection will extend into areas which were not intended to be covered, and the likelihood of false alarms increases. Therefore, to avoid resetting the system every time atmospheric conditions change, it is desirable to broadcast at increased frequencies, which are less subject to such changes. The unique filter block of the invention enables operation at frequencies higher than 25 KHz. For example, operation may be at 30 KHz or more, with much reduced likelihood of false alarms. An operating frequency of between 35 and 45 KHz is preferred, and 40 KHz has been selected as a particularly suitable frequency. Of course the filter block can also be used with lower frequency systems.

Although the filter block of the invention has been described with reference to an ultrasonic intrusion alarm, it is also applicable to an intrusion alarm using electromagnetic radiation. Such intrusion alarms operate in the same manner as ultrasonic intrusion detectors, and again the filter block of the invention may be used to eliminate undesired frequency components from the comparison signal.

It will be appreciated that although the system described operates when the average level of the d.c. signal from filter block 14 rises above level 18 in FIG. 4e, the system can be inverted so that the average level of the d.c. output from filter block 14 is a maximum at frequencies outside the range of interest and is below a predetermined level in the frequency range of interest. In the appended claims, therefore, the term "increase" as used with reference to signal levels, includes an increase in a positive sense and an increase in a negative sense, as may be appropriate.

What I claim is:

1. An intrusion alarm comprising:
   (1) means for transmitting a radiation field in an area to be supervised, (2) means for receving a portion of the radiation field which is reflected from objects in the supervised area, (3) means for comparing the transmitted and received fields and for producing a comparison signal having pulsations the frequency of which is indicative of the speed of movement of an object in said supervised area, (4) means connected to said comparison means for generating an output pulse train of constant peak amplitude, said output pulse train having an average level, said means for generating including means for controlling the duty cycle of said output pulse train for said average level of said output pulse train to increase as the frequency of said comparison signal increases, until the frequency of said comparison signal reaches a selected frequency, and then to decrease as the frequency of said comparison signal increases beyond said selected frequency, (5) integrating means, connected to said means for generating (4), for integrating said output pulse train to produce an integrated d.c. signal therefrom, said d.c. signal having an average level, (6) and means connected to said integrating means and responsive to said average level of said integrated d.c. signal for producing an alarm signal when such average level rises above a preselected level.

2. An intrusion alarm according to claim 1 wherein said means for generating includes means for producing pulses for said output pulse train wherein each such pulse corresponds to a pulsation of said comparison signal, and said means for controlling includes means for controlling the duration of each said pulse of said output pulse train so that the duration of such pulse is a controlled duration equal to the lesser of (i) a fixed duration, and (ii) the duration of its corresponding pulsation in said comparison signal less a fixed interval.

3. An intrusion alarm according to claim 2 wherein said means for controlling the duration of each said pulse of said output pulse train includes:

(a) first generating means coupled to said comparison means and operative on receipt of said comparison signal to generate a first intermediate pulse train having constant maximum amplitude first intermediate pulses, each corresponding to a pulsation of said comparison signal, each first intermediate pulse having a leading edge having a predetermined slope such that each intermediate pulse requires said fixed interval to reach a predetermined level, (b) second generating means connected to said first generating means and operative during receipt of signals of level above said predetermined level for thereby generating a second intermediate pulse train having second constant amplitude intermediate pulses each commencing at said fixed interval after the commencement of its corresponding first intermediate pulse and each terminating on termination of its corresponding first intermediate pulse, (c) third generating means connected to said second generating means and responsive to each second intermediate pulse for generating a constant amplitude third pulse, each third pulse commencing upon receipt of its associated second intermediate pulse and terminating upon the ending of said controlled duration, said third pulses together constituting said output pulse train.

4. An intrusion alarm according to claim 3 wherein said first generating means includes a first amplifier having an output, a resistance connected to said output, a capacitance connected to an end of said resistance remote from said output terminal and adapted to be connected to a power supply for said system, and a diode connected in parallel with said resistance, said first amplifier being connected to said comparison means (3) for producing constant amplitude fourth pulses each corresponding to a pulsation of said comparison signal, said diode being oriented so that it is reverse biased upon its receipt of the leading edge of a said fourth pulse and so that it is forward biased upon its receipt of the trailing edge of such fourth pulse, so that said capacitance charges through said resistor on receipt of the leading edge of a said fourth pulse and discharges through said diode on receipt of the trailing edge of such fourth pulse, and said second generating means comprising a second amplifier having an input connected to said end of said resistance and having an output, said second amplifier being biased for conduction only when the voltage at its input rises above said predetermined level, the output of said second amplifier being said second intermediate pulse train.

5. An intrusion alarm according to claim 4 wherein said third generating means comprises a third amplifier having an input, a capacitance connected between said input of said third amplifier and said output of said second amplifier, a resistance connected between said input terminal of said third amplifier and adapted to be connected to said power supply, and a diode connected in parallel with said last mentioned resistance, said last mentioned diode being oriented so that it is reverse biased when the leading edge of a said second intermediate pulse is received at said input of said third amplifier and so that it is forward biased when the trailing edge of a said second intermediate pulse is received at said input of said third amplifier, so that when the leading edge of each said second pulse appears at the output of said second amplifier, a corresponding step voltage is applied through said last mentioned capacitance to the input of said third amplifier, the voltage at the input of said third amplifier then varying as said last mentioned capacitance charges through said last mentioned resistance, and means biasing said third amplifier for conduction only until the voltage at its input reaches a selected level, the output of said third amplifier being said output pulse train.

6. An intrusion alarm according to claim 2 wherein said means for transmitting transmits an ultrasonic sound field of frequency greater than 30 KHz.

7. An intrusion alarm according to claim 2 wherein said means for transmitting transmits an ultrasonic sound field of frequency between 35 KHz and 45 KHz.

8. A method of detecting intruders comprising:

(1) transmitting a radiation field in an area to be supervised, (2) receiving a portion of the radiation field which is reflected from objects in the supervised area, (3) comparing the transmitted and received fields and producing a comparison signal having pulsations the frequency of which is indicative of the speed of movement of an object in the supervised area, (4) generating an output pulse train of constant peak amplitude, each pulse of which corresponds to a pulsation of said comparison signal, said output pulse train having an average level, (5) controlling the duty cycle of said output pulse train so that the average level thereof increases as the frequency of said comparison signal increases until the frequency of said comparison signal reaches a selected frequency, and then decreases as the frequency of said comparison signal increases beyond said selected frequency, (6) integrating said output pulse train to produce an integrated d.c. signal having an average level, (7) and generating an alarm signal when the average level of said integrated d.c. signal rises above a preselected level.

9. A method according to claim 8 and including the step of controlling the duration of each pulse of said output pulse train so that its duration is equal to the lesser of a fixed duration and the duration of its corresponding pulse in said comparison signal less a fixed interval.

* * * * *